(12) United States Patent
Vanderheyden et al.

(10) Patent No.: US 9,171,566 B2
(45) Date of Patent: Oct. 27, 2015

(54) BUCKLING MECHANISM FOR A TAPE DRIVE LOADER

(71) Applicant: Oracle International Corporation, Redwood City, CA (US)

(72) Inventors: William Joseph Vanderheyden, Loveland, CO (US); Joshua Adrian Hursh, Boulder, CO (US); Jonathan Zeller Oster, Denver, CO (US); Frederick Patton Mondale, Boulder, CO (US); Daniel Mark Baiada, Boulder, CO (US); Benjamin Joseph Krempasky, Honesdale, PA (US); William Jacob Derryberry, Arvada, CO (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 0 days.

(21) Appl. No.: 14/261,238

(22) Filed: Apr. 24, 2014

(65) Prior Publication Data

US 2015/0262608 A1      Sep. 17, 2015

Related U.S. Application Data

(60) Provisional application No. 61/952,715, filed on Mar. 13, 2014.

(51) Int. Cl.
*G11B 15/67*   (2006.01)
*G11B 15/675*   (2006.01)

(52) U.S. Cl.
CPC ............ *G11B 15/672* (2013.01); *G11B 15/674* (2013.01); *G11B 15/6751* (2013.01)

(58) Field of Classification Search
USPC .......................................................... 360/83
See application file for complete search history.

(56) References Cited

U.S. PATENT DOCUMENTS

2005/0051653 A1*   3/2005  Rathweg ................... 242/332.4
2005/0253009 A1*  11/2005  Vanderheyden et al. .. 242/332.4

\* cited by examiner

*Primary Examiner* — Wayne Young
*Assistant Examiner* — Carlos E Garcia
(74) *Attorney, Agent, or Firm* — Marsh Fischmann & Breyfogle LLP; Daniel J. Sherwinter

(57) ABSTRACT

Embodiments include systems and methods for buckling in a loader assembly of a tape storage drive. Some implementations translate driving forces of an elevator of the loader assembly into driving forces that act on a pusher plate of a buckling mechanism in both buckling and unbuckling directions. For example, a plate interface can couple the pusher plate with the elevator in a manner that translates rotational motion of the elevator's drive gear into a lateral driving force that drives the pusher plate between its home and buckling positions. Certain implementations also include a home holding mechanism for removably securing the pusher plate in the home position when the elevator is in its unloaded position.

17 Claims, 17 Drawing Sheets

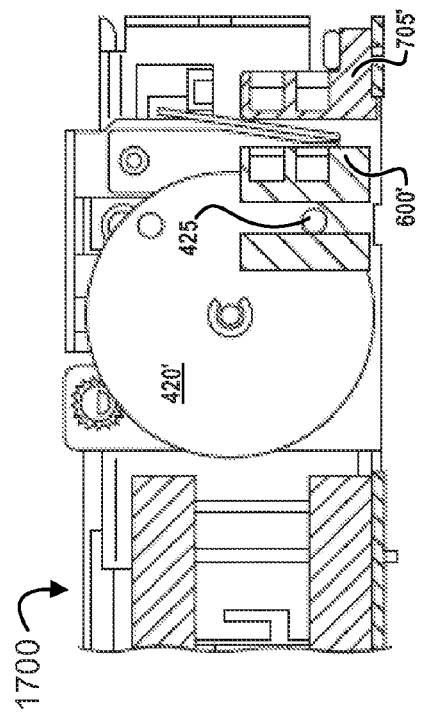
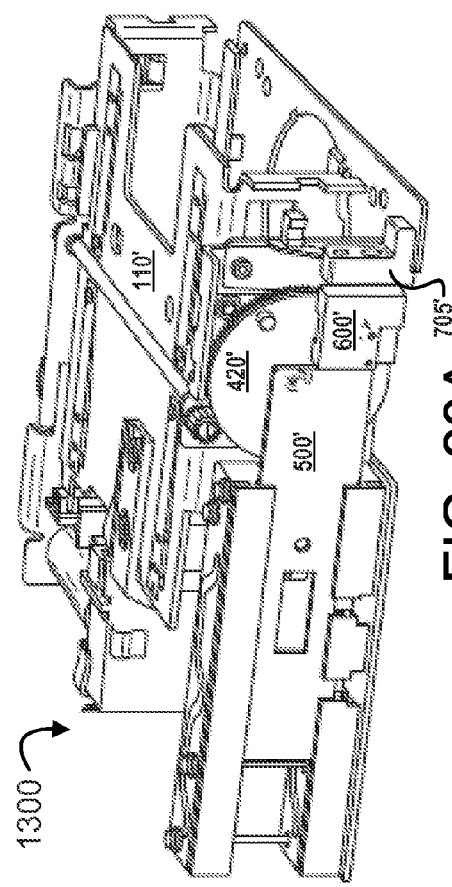
FIG. 23B
FIG. 23A

BUCKLING MECHANISM FOR A TAPE DRIVE LOADER

FIELD

Embodiments relate generally to tape drives, and, more particularly, to buckling mechanisms for loader portions of tape drives.

BACKGROUND

Magnetic recording tape is commonly used to store digital data because magnetic recording tape is inexpensive and provides significant data storage capacity per unit volume. Consequently, magnetic recording tape remains an active component in many business operations, especially where large amounts of data must be backed-up for archival purposes. Magnetic recording tape may be housed in a tape cartridge or cassette, which protects the magnetic recording tape from damage. For example, a tape cartridge generally includes either one or two tape reels for storage of the magnetic recording tape within the tape cartridge.

Data may be read from, or written to, the magnetic recording tape by inserting the tape cartridge, which contains the magnetic recording tape, into a tape drive. Tape drives typically include a tape loader mechanism that receives the cartridge and prepares the tape for reading and/or writing by the drive. For example, the tape loader mechanism can include a cartridge slot, an elevator, and one or more components for coupling the magnetic tape reel to read/write components of the drive. The tape drive can then pass the magnetic recording tape across a read/write head contained within the tape drive.

Some tape loader mechanisms, such as those included in certain tape drives produced by Oracle Corporation, use a so-called "buckling mechanism" for coupling the magnetic tape reel to read/write components of the drive. For example, some drives use a so-called "two-leader threading mechanism" that involves effectively coupling a cartridge reel tape leader (e.g., an unrecorded portion of tape, or the like, connected to the end of the magnetic tape in a tape cartridge) with a drive reel leader (e.g., an unrecorded portion of tape, or the like, connected to a take-up reel in the tape drive) to permit the drive take-up reel to take up the magnetic tape from the drive. The buckling mechanism can be used to perform the coupling by buckling the cartridge reel tape leader and the drive reel leader together, after which a tape drive motor can wind the drive reel leader onto the tape drive take-up reel. This can cause the magnetic tape to be pulled from the tape cartridge through the drive's tape path.

BRIEF SUMMARY

Among other things, embodiments provide novel systems and methods for buckling in a loader mechanism of a tape drive. Some embodiments are implemented in a manner that avoids use of a large-footprint tension spring, thereby permitting the footprint of the loader mechanism to be reduced. For example, the buckling forces can be provided directly by a tape drive's main motor (or another motor) via a pin interface between an elevator and a pusher plate of the loader. The pin interface can drive the pusher plate of the buckling mechanism in both forward and reverse directions. This can reduce the overall footprint of the buckler mechanism, while also lowering the torque on the drive motor and removing the spring force from the buckling mechanism. Some implementations further include a locking mechanism (e.g., implemented electrically, magnetically, and/or mechanically) that can hold the pusher plate in a "home" position without requiring a spring force.

According to one set of embodiments, a buckling assembly is provided for a tape drive loader. The buckling assembly includes: a pusher plate that operates to move in a buckling direction and an unbuckling direction between a home position and a buckling position; and a plate interface that couples the pusher plate with an elevator of the tape drive loader so as to translate motion of the elevator into a driving force that drives the pusher plate in the buckling direction during tape cartridge loading by the elevator and drives the pusher plate in the unbuckling direction during tape cartridge unloading by the elevator.

According to another set of embodiments, a tape drive system is provided. The tape drive system includes: means for transporting a tape cartridge from an unloaded position to a loaded position during tape cartridge loading and to transport the tape cartridge from the loaded position to the unloaded position during tape cartridge unloading; a pusher plate that operates to move in a buckling direction and an unbuckling direction between a home position and a buckling position; and means for translating motion of the means for transporting into a driving force that drives the pusher plate in the buckling direction during tape cartridge loading and drives the pusher plate in the unbuckling direction during tape cartridge unloading.

According to another set of embodiments, a method is provided for buckling in a tape drive loader. The method includes: first translating, during loading of a tape cartridge by an elevator of the tape drive loader, motion of a feature of the elevator into a driving force via a plate interface to drive a pusher plate of a buckling mechanism of the tape drive loader in a buckling direction from a home position to a buckling position; and second translating, during unloading of the tape cartridge by the elevator, motion of the feature of the elevator into the driving force via the plate interface to drive the pusher plate in an unbuckling direction from the buckling position to the home position.

BRIEF DESCRIPTION OF THE DRAWINGS

The present disclosure is described in conjunction with the appended figures:

FIGS. 23A and 23B show a seventh stage of the assembly view of the loader assembly and the partial cut-away portion of the loader assembly, respectively;

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention. For example, some figures include components that are intended to add clarity and context, but are not part of the inventive embodiments; while other figures show only particular components out of context to avoid over-complicating the figures. Further, while embodiments are described with reference to particular, illustrative tape drive systems, the embodiments are not intended to be limited to use of those particular tape drive systems or even particularly to magnetic recording tape.

Figure 1:
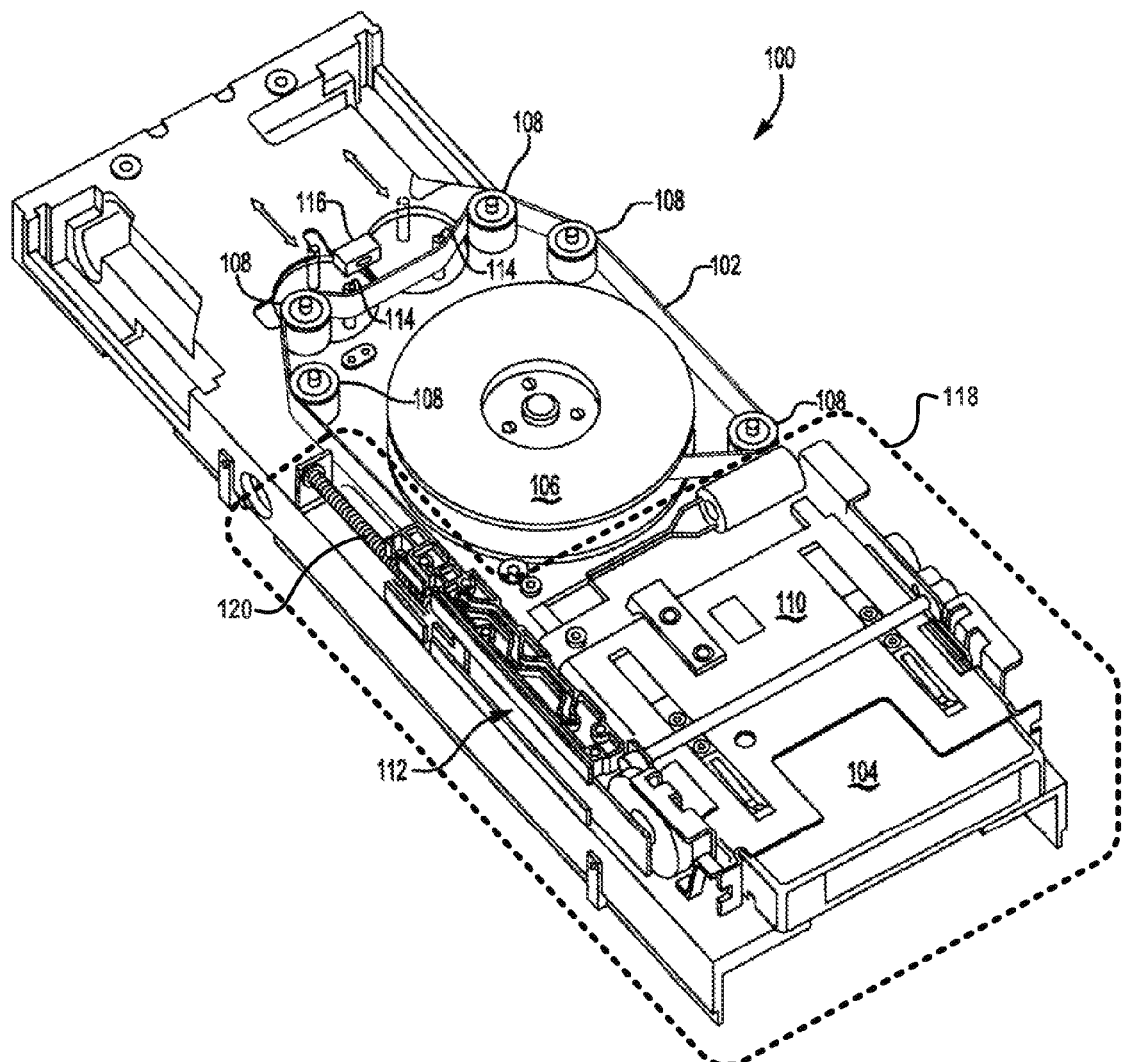
FIG. 1 shows an illustrative conventional tape drive that uses a buckling mechanism as part of its loader.

Turning first to FIG. 1, an illustrative conventional tape drive 100 is shown that uses a buckling mechanism 112 as part of its loader 118. The illustrated tape drive 100 is configured to receive and interface with a single reel tape cartridge 104. For example, when the tape cartridge 104 is inserted into the tape drive 100, it is received in a tape drive elevator 110, which houses the tape cartridge 104 while in the tape drive 100. The tape drive elevator 110 can lower the tape cartridge 104 onto a tape drive motor (not shown), which can provide power to move magnetic recording tape 102 from the tape cartridge 104 to a tape drive take-up reel 106.

As illustrated, a buckling mechanism 112 can buckle a tape leader connected to the free end of magnetic recording tape 102 to a drive reel leader connected to tape drive take-up reel 106. As used herein, "buckling" is intended generally to mean any suitable coupling or joining together of the tape leader of the magnetic recording tape 102 and the tape leader of the tape drive take-up reel 106. For example, the buckling facilitates threading the magnetic recording tape 102 along a tape path within tape drive 100 to tape drive take-up reel 106. The tape path can include any suitable number, type, and/or configuration of tape guide components, such as, for example, tape guide posts 108 (e.g., for guiding directional changes of the magnetic tape through the tape path) and head protect pins 114 (e.g., for protecting the tape head 116 from the drive reel leader and the standard tape leader during threading and unthreading operations). In general, the magnetic recording tape 102 is routed between the tape cartridge 104 to the tape drive take-up reel 106 across one or more tape heads 116, which performs read/write operations on magnetic recording tape 102.

As described above, the purpose of the buckling mechanism 112 is to attach the tape leader of the tape drive take-up reel 106 to the tape leader of the magnetic recording tape 102. Successful connection of the two can allow the magnetic tape to be drawn out of the tape cartridge for reading and/or writing by the tape heads 116. Buckling occurs after the cartridge is inserted into the tape drive, the tape cover is opened, and the whole cartridge is lowered into position by the elevator 110. In some implementations, the tape drive elevator 110 is in mechanical communication with the buckling mechanism 112. For example, lowering of the tape cartridge 104 can be achieved by a spiral shaped track on the backside of the tape drive elevator 110 gear, and a front side of the same gear can feature a post that can be used to drive the buckling action of the buckling mechanism 112. Once the tape cartridge 104 is in place, the leader of the tape drive take-up reel 106, which can feature a button head pin at its end or some other coupling component, can begin to be pulled by the tape drive take-up reel 106.

In some embodiments, resistance to this leader tension can be countered by the buckling mechanism 112 itself, which can include a hook slotted into a cam track that forces the mechanism to move not only in the direction of the leader but also orthogonally to it (e.g., to achieve the desired buckling). The buckling mechanism 112 can be restrained by a pusher plate, which, in turn, can be translated via rotation of the elevator gear and the pusher pin on its front side. As the pusher plate moves towards the back of the tape drive 100, the buckling mechanism 112, still hooked to a tight tape drive take-up reel 106 leader, can interface with the leader of the magnetic recording tape 102. For example, movement of the tape drive take-up reel 106 can cause a button head pin on its leader's tip to hook into a matching hole in the leader of the magnetic recording tape 102. The leader of the magnetic recording tape 102 can then be drawn out of its tape cartridge 104. After successful buckling of the two leaders, the hook maintaining tension on the tape drive take-up reel 106 can slide out of place, and the leaders can be pulled through the tape heads 116 and wrapped around the tape drive take-up reel 106. The same process can be reversed to unbuckle the tape leader, thereby allowing safe removal of the tape cartridge 104.

The illustrated buckling mechanism 112 shows that force applied to the pusher plate by the tape drive elevator 110 mechanism can be counteracted by a spring 120. Typically, the spring 120 is a large-footprint spring in order to provide the counteracting force in a manner that is sufficiently strong and relatively consistent over most or all of the pusher plate's displacement. The large footprint of the spring 120 can increase the overall footprint of the tape loader 118.

Embodiments described herein seek to shorten the overall length of the buckling mechanism on the tape loader of a tape drive. Some embodiments employ novel techniques for reconfiguring the spring. Other embodiments use novel techniques to eliminate the spring altogether. For example, certain embodiments can be implemented within a footprint that is nearly a third smaller than its conventional counterpart (e.g., more than three inches shallower). This space saving can allow the overall size of the tape drive to be reduced (e.g., for smaller tape libraries, etc.) and/or can free up space in the tape drive for other components, such as the tape path and the read/write heads, to be more optimally implemented.

Spring-Based Embodiments

As illustrated in FIG. 1, some conventional buckling mechanism implementations include a spring that provides proper loading force on the pusher plate. For example, an active mechanism (e.g., an elevator gear and pin assembly) applies a force to drive the pusher plate in one direction, and, when the force from the active mechanism is not longer present, the spring force is used to move the pusher plate back to its home position and to hold it there. To help ensure that the spring force is substantially constant across a desired distance of travel of the pusher plate, a relatively long spring is typically used. Accordingly, such buckling mechanisms are sized to accommodate the long spring, which tends to increase the size of the loader and the overall footprint of the tape drive. Various embodiments described herein use a spring to provide proper loading force on the pusher plate, but in a manner that permits a reduction in the size of the buckling mechanism.

Figure 2:
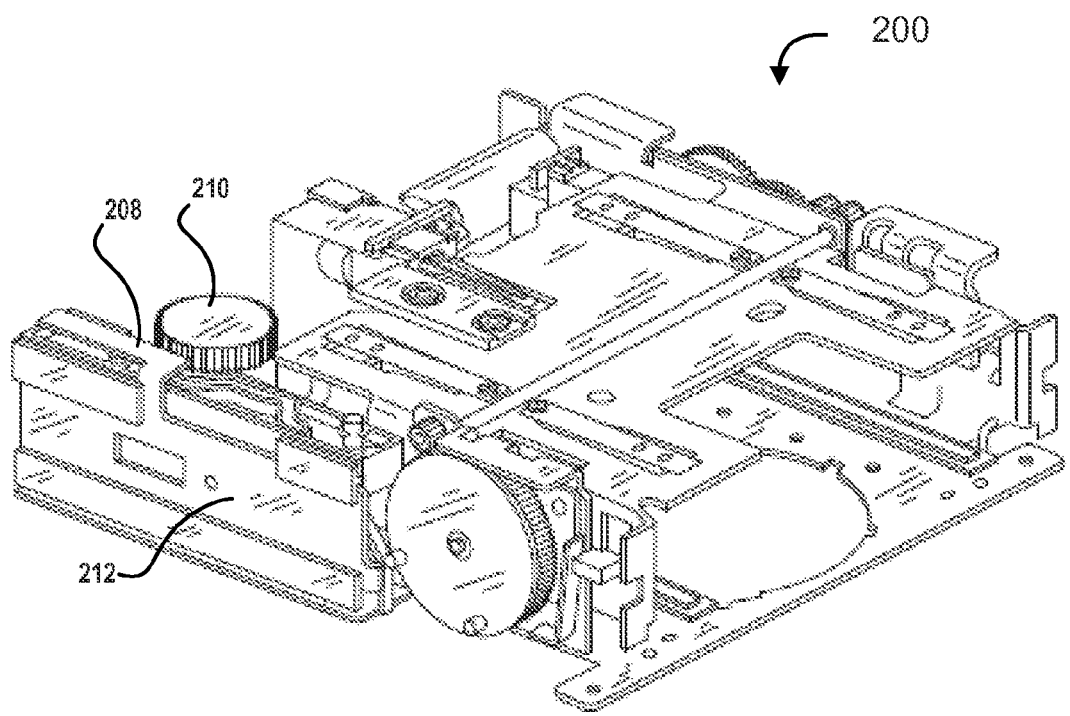
FIG. 2 shows an illustrative tape drive loader having spring-loaded buckling mechanism using a spiral-shaped spring.

FIG. 2 shows an illustrative tape drive loader 200 having spring-loaded buckling mechanism using a spiral-shaped spring. For example, the spiral-shaped spring can be a "clock" spring, a "power" spring, or the like. Such spiral-shaped springs can deliver comparable force and travel to a conventional compression spring design (e.g., as shown in FIG. 1), while occupying appreciably less space. In some implementations, the spiral-shaped spring is in mechanical communication with the pusher plate 212 to provide spring force thereto. For example, the spiral-shaped spring can be nested inside of a gear in communication with a rack, a pulley system to redirect the spring force towards the pusher plate 212, etc. In the illustrated implementation, a spur gear 210 with an internally nested spiral-shaped spring (e.g., a clock spring) is in mechanical communication with a toothed rack 208 feature of (or addition to the pusher plate 212.

Figure 3:
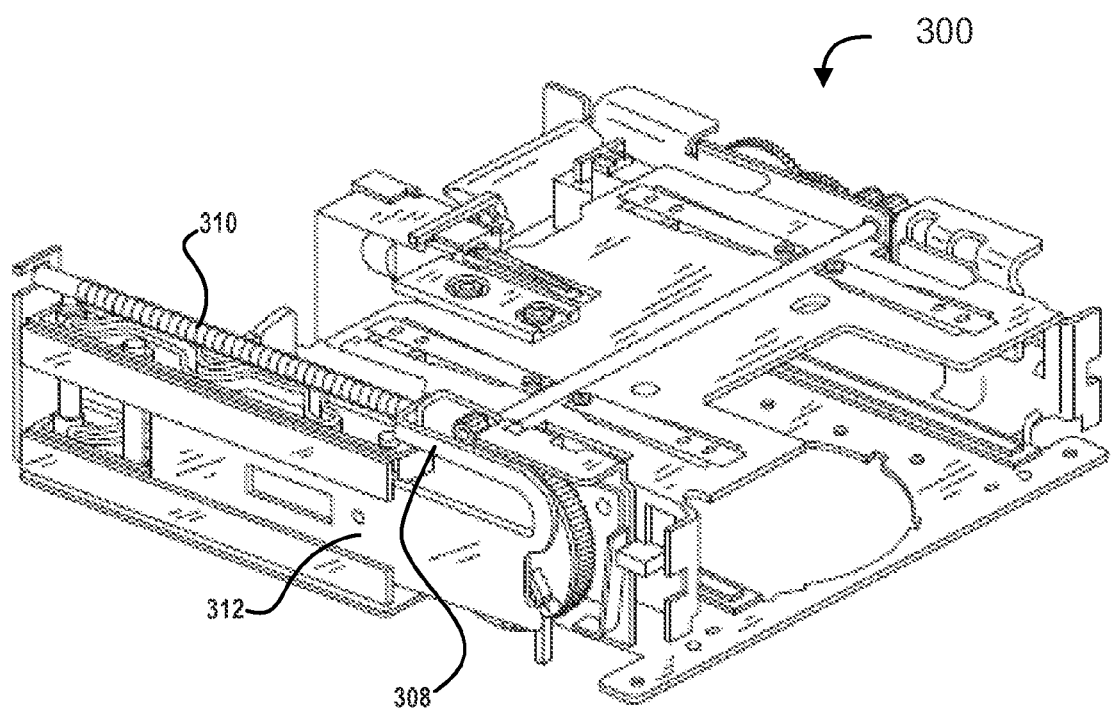
FIG. 3 shows an illustrative tape drive loader having spring-loaded buckling mechanism using a compression spring.

FIG. 3 shows an illustrative tape drive loader 300 having spring-loaded buckling mechanism using a compression spring 310. Some such implementations use a spring 310 similar to the one described with reference to FIG. 1. As illustrated, the pusher plate 312 is designed with an interface tab 308 that can interface with the spring 310 in a manner similar to that described with reference to FIG. 1, but with an appreciably shorter overall footprint. For example, the illustrated implementation includes a top-mounted compression spring 310 interfacing with the pusher plate 312. It is noted that locating the compression spring 310 away from the center of the pusher plate 312 can result in application of the spring force away from the center of the pusher plate 312. This can cause torque on the pusher plate 312, thereby increasing friction throughout the plate's buckling motion, which can increase strain on the drive motor, increase wear on the cam track, etc. Accordingly, some implementations of the pusher plate 312 are designed (e.g., reinforced, shaped, etc.) to account for the changes in torque and/or friction.

Springless Embodiments

As described above, some conventional buckling mechanism implementations include a spring that provides proper loading force on the pusher plate. Various embodiments described herein include techniques for moving the pusher plate without the aid of a spring force. Such embodiments include a mechanical interface between the drive motor and the pusher plate that operates to actively move the pusher plate in both forward and reverse directions. For example, embodiments can include a pin assembly that mechanically couples a gear of the drive motor to the pusher plate in such a way that mechanically links movement of the drive elevator to the buckling mechanism with proper force, travel, and timing. One implementation includes a notched lever arm designed to mesh with a drive gear post, allowing the pusher plate to be physically pinned to the elevator drive gear throughout the buckling process. In another implementation, the pusher plate includes a slot designed to "catch" the drive gear's post and directly connect the pusher plate and drive gear assembly.

Figure 4:
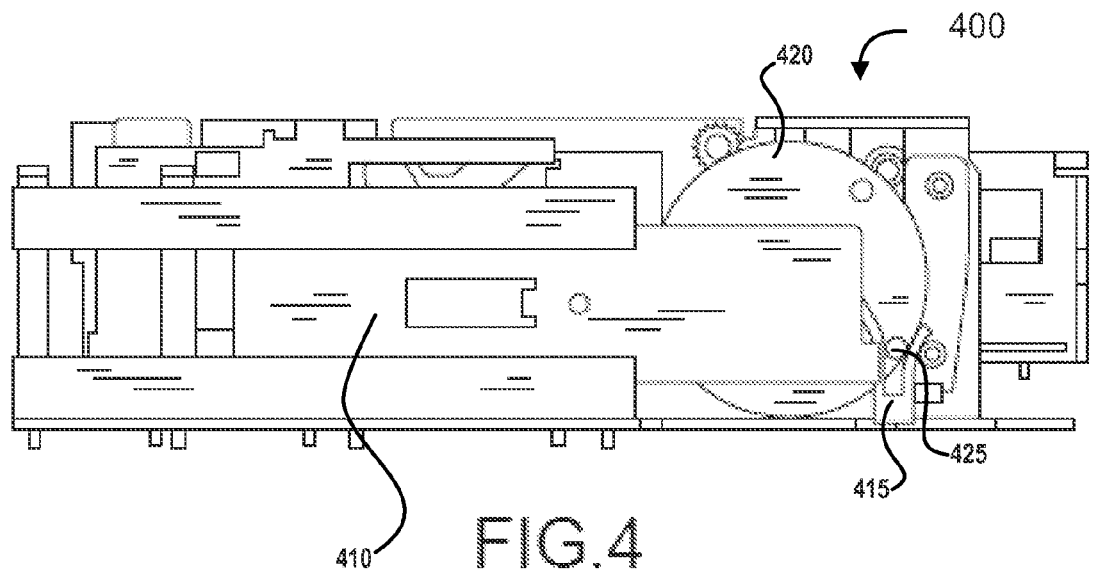
FIG. 4 shows a side view of an illustrative tape drive loader with a springless buckling mechanism.

FIG. 4 shows a side view of an illustrative tape drive loader 400 with a springless buckling mechanism. The buckling mechanism includes a pusher plate 410 coupled with a pin interface 415. A drive gear 420 of the tape drive loader 400 includes one or more pins 425. The pins 425 and the pin interface 415 are designed, so that rotation of the drive gear 420 (e.g., when the drive motor moves an elevator holding a tape cartridge) is translated via the pins 425 and the pin interface 415 into a lateral driving force applied to the pusher plate 410. The pin interface 415 can be coupled with the pusher plate 410 in various ways. For example, the pin interface 415 can be an integrated feature of the pusher plate 410 (e.g., machined or bent into the pusher plate 410), removably or permanently fastened to the pusher plate 410, etc.

Figure 8:
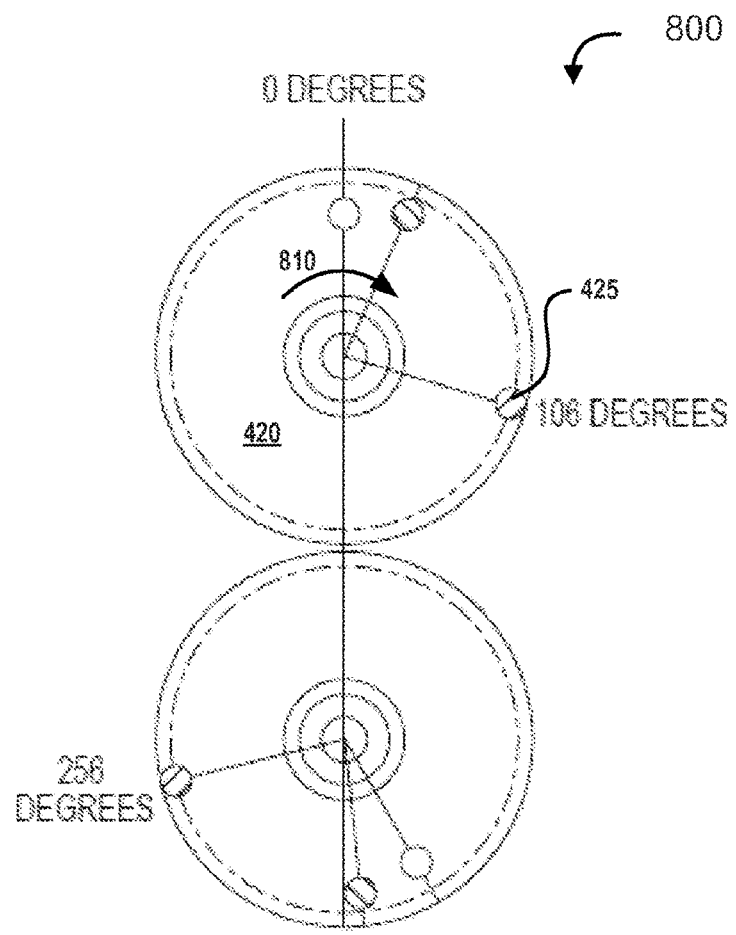
FIG. 8 shows a graphical representation of the rotational motion of a pin located on a drive gear of a drive loader elevator.

The mechanism can be further designed (e.g., sized, positioned, etc.) so that a certain amount of drive gear motion will be translated into a desired amount of lateral travel of the pusher plate 410. In the illustrated implementation, this is accomplished by positioning the pins 425 on the drive gear 420 in such a way that a previously determined amount of drive gear 420 rotation (e.g., previously designed to move the elevator by a certain amount) will drive the pusher plate 410 a certain lateral distance. For example, as illustrated in FIG. 8, one implementation includes a pin 425 located so that the outermost point of its circumference lies approximately on the circumference of the drive gear 420 at approximately 106 degrees from a vertical axis of the drive gear 420. This placement can affect how much rotational travel of the drive gear 420 (e.g., in the direction indicated by arrow 810) is translated into lateral travel of the pusher plate 410 (e.g., the radius between the pin 425 and the rotational axis of the drive gear 420 can affect the lateral distance over which the pin 425 moves for a given amount of rotational movement of the drive gear 420) and an amount of delay between the start of rotation of the drive gear 420 and the start of pusher plate movement (e.g., the angle of pin 425 placement can affect how much rotational movement of the drive gear 420 occurs before the pin 425 interfaces with the pusher plate and begins moving the pusher plate laterally). In other implementations, a desired amount of lateral movement can be accomplished in other ways, including by redesigning the drive gear to change the amount of rotation that occurs, by coupling the pins 425 to the drive gear 420 via additional gearing or the like to effectively change the amount of rotation applied to the pins 425, by changing the pin interface to affect the translation of rotational to lateral motion (e.g., by delaying the physical coupling of the pins 425 to the pin interface until later in the rotation of the drive gear 420), etc.

As illustrated in FIG. 8, the top schematic corresponds to the elevator gear's position at the end of lowering the tape into the drive, and the bottom schematic shows the elevator gear's final position when the spiral pattern used for lowering a tape into the drive prevents any more angular travel. The design accommodates 150 degrees of angular travel between the end of lowering and the end of the spiral. Using a start angle of approximately 117 degrees, can comfortably separate pusher plate motion from the lowering process by approximately 11 degrees of elevator gear rotation, and can achieve a desired pusher plate travel using only 114 degrees of rotation for a total angular displacement of 125 degrees. Further, as illustrated, the pin's 425 vertical position in the PPI slot in the buckled position can be slightly more than one diameter below the height at which the pusher post enters the slot at the beginning of buckling, which can allow the pin 425 to be used to move the pusher plate in both directions using only a vertical slot.

Returning to FIG. 4, as described above, the mechanical communication between the drive gear 420 and the pusher plate 410 is designed so that movement of the drive gear 420 drives lateral movement of the pusher plate 410 in both forward and reverse directions. In some implementations, the pin 425 and/or pin interface 415 are designed so that the pusher plate 410 is held in a home position (e.g., an unbuckled position) when the elevator is in position to eject or receive a tape cartridge. This can be desirable to ensure proper holding of the pusher plate 410 in the unloaded home position during operational shock, vibration, etc. For example, the pin interface 415 can be shaped so that the pin 425 remains engaged while the pusher plate 410 is in the home position, and forces of the drive gear 420 (e.g., internal friction of the drive motor and/or other forces) effectively hold the pusher plate in place. In other implementations, such holding forces may not be available via the pin 425, and an additional home-holding mechanism is included. For example, some implementations allow some amount of rotation of the drive gear 420 to occur before the buckling begins and/or after the unbuckling completes by designing the pin 425 to engage with and disengage from the pin interface 425 during a portion of the drive gear 420 rotation. Because the pin 425 can be disengaged from the pin interface 415 when the pusher plate 410 is in the home position, the pin 425 may not provide any home-holding force. For example, as described more fully below, a magnet or set of magnets can be used to hold the pusher plate in position when the pusher pin is not engaged (i.e., in its slot).

Other implementations include electromagnets, friction elements, detents, and/or other elements as part of the home-holding mechanism.

The remainder of the description focuses on one set of embodiments that includes a novel, springless design for the buckling mechanism. According to such embodiments, the pin is slotted into a groove designed to force the pusher plate to match its position with the pin when moving in both forward and reverse directions. Such embodiments also include a home-holding mechanism. As described below, the home-holding mechanism can be implemented in various ways, including using removable magnetic and/or mechanical couplings that effectively become active when the pusher plate is in the home position. Certain components of the exemplary tape drive loader are shown independently or in smaller groupings to add clarity to the description, but not to limit other possible configurations of those components. Generally, the specific implementations are intended only to provide added clarity and to illustrate certain functionality, but they are not intended to represent the only implementations. Rather, modifications can be made to the shapes, orientations, couplings, and/or other aspects of components of the illustrated implementations without departing from the scope of the embodiments they represent.

Figure 5:
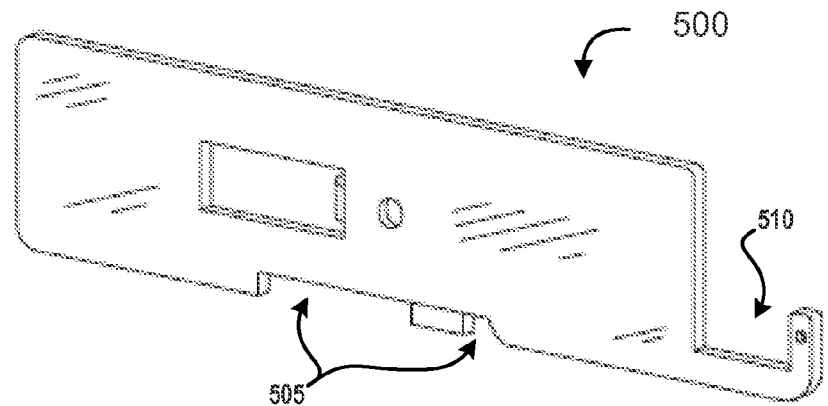
FIG. 5 shows an illustrative implementation of a pusher plate for use with certain embodiments.

FIG. 5 shows an illustrative implementation of a pusher plate 500 for use with certain embodiments. As illustrated, in comparison with some previous pusher plate designs, the back end of the pusher plate 500 can be appreciably shortened to fit smaller size constraints, and the molded spring mount can be eliminated. Some implementations include slots 505 (e.g., two are shown) to trip position sensors. An interface portion 510 of the pusher plate 500 can be extended out and shaped for attachment with a pin-plate interface (PPI), as described below. In other implementations, the interface portion 510 includes the PPI (e.g., as an integrated portion).

Figure 6:
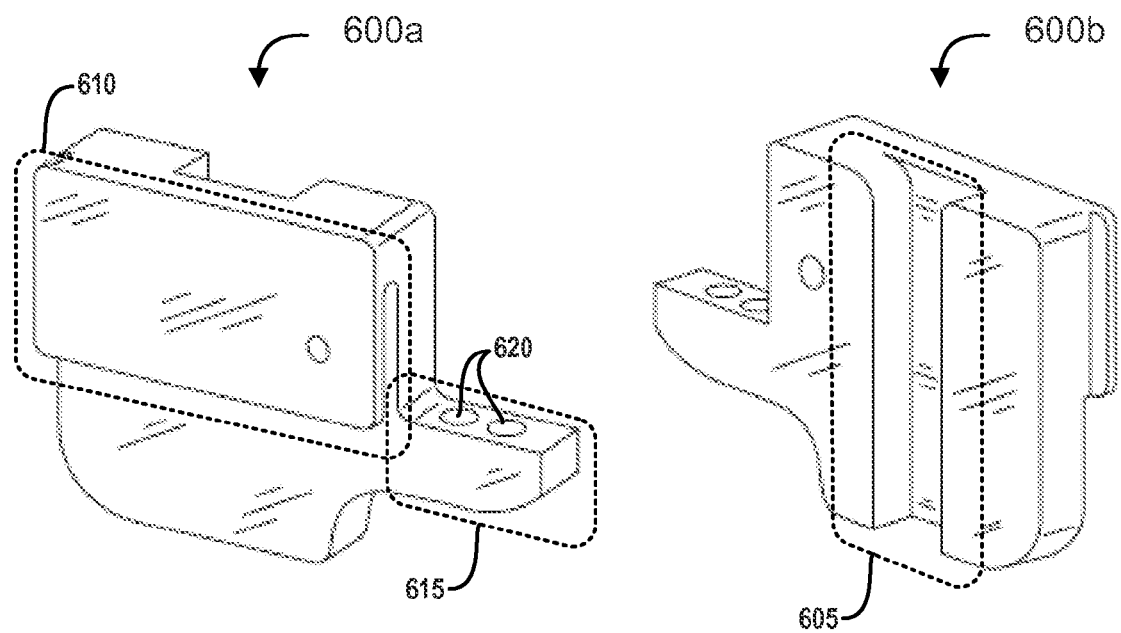
FIG. 6 shows an illustrative implementation of a pin-plate interface (PPI) for use with certain embodiments.

FIG. 6 shows an illustrative implementation of a pin-plate interface (PPI) 600 for use with certain embodiments. As illustrated, the PPI 600 can include a number of regions for different functionality, including, for example, a pin interface region 605, a pusher plate interface region 610, and a home holding region 615. The pin interface region 605 can be designed (e.g., shaped, sized, oriented, positioned, etc.) to receive a feature (e.g., the pin 425 of the drive gear 420 discussed above) in order to couple elevator motion to buckler motion. For example, as described with reference to FIG. 4, a pin 425 of the drive gear 420 can interface with the pusher plate 410 via a pin interface 415 provided by the pin interface region 605 of the PPI 600. The pin interface region 605 slot can effectively translate angular travel (e.g., as dictated by the design of the elevator gear's spiral design, the available range of post radii, and the angle at which the pusher post enters the slot and begins displacing the pusher plate) into linear travel of the pusher plate. In this way, the rotational motion of the drive gear 420 can be translated into lateral motion of the pusher plate 410, thereby effectively coupling the elevator motion with the buckler motion. It is noted that other implementations can be designed to couple the elevator motion to the buckler motion in any suitable manner. Some implementations of the pin interface region 605 include slot dimensions that are carefully designed to achieve desired travel of the pusher plate for proper pusher plate dynamics for buckling and unbuckling.

The pusher plate interface region 610 can be designed to couple the PPI 600 with a pusher plate of a buckling mechanism (e.g., where the PPI 600 is manufactured separately from the pusher plate). The coupling can include any suitable manner of permanent and/or removable coupling between the components. For example, some embodiments of the PPI 600 are implemented as a molded (e.g., plastic) piece that is coupled with (e.g., fastened to) the pusher plate for interfacing with said plate and the rotating pusher pin on the elevator drive gear. For example, the PPI 600 effectively becomes the slot where the pusher pin applies force to perform the buckling and unbuckling events. Various implementations couple the PPI 600 with the pusher plate by molding, press fitting, riveting, and/or in any other suitable manner. As shown, a combination of a pin and a press fit can be used to attach the PPI to the pusher plate. For example, the press fit can secure the PPI to the pusher plate, and the pin can act as a mechanical backup.

The home holding region 615 can be designed to include whatever features are used to hold the pusher plate in its home position when desired (e.g., when in an unloaded state). In the illustrated implementation, the home holding region 615 includes two magnets 620 that can magnetically hold the pusher plate in the home region. In other implementations, the home holding region 615 can include any suitable features, such as friction features (e.g., ridges, texturing, etc.), magnetic features (e.g., magnets, magnetic material, electromagnets, etc.), etc. In certain implementations, features can be actuated by other features. For example, a feature in mechanical communication with the drive gear can selectively release a home-molding feature (e.g., toggle a switch of an electromagnet, insert a non-magnetic material to break a strong magnetic coupling, depress a spring-loaded latch, etc.).

Figure 9:
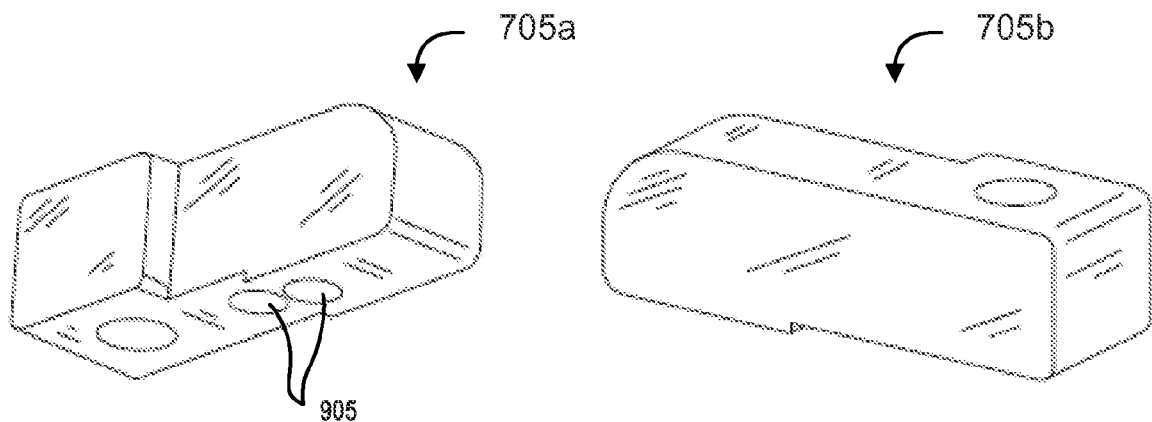
FIG. 9 shows an illustrative implementation of a home holding mechanism for use in certain embodiments

FIG. 9 shows an illustrative implementation of a home holding mechanism 705 for use in certain embodiments. As illustrated, the home holding mechanism 705 can be implemented as a molded (e.g., plastic) component, which can be mounted to the drive loader's chassis or in any other suitable location and in any suitable fashion. In one implementation, a pair (or any suitable number) of magnetic elements 905 on the home-holding mechanism is positioned to magnetically couple with a pair of magnets on the PPI when in the home position. The magnetic coupling is designed to be strong enough to hold the pusher plate in the home position while the pin is disengaged under at least certain predicted environmental conditions. For example, the magnetic coupling can be designed to hold the pusher plate in position against the tensioning force from the leader (e.g., about 0.2 pounds), as well as any other operational shock forces while the pusher plate is in the home position. The magnetic elements 905 can also provide an interim force holding the pusher plate in place after the pusher pin leaves the PPI slot and until the shipping pin encounters the backside of the PPI. Once the shipping pin has rotated into place operational shock will not affect/dislodge the pusher plate. The magnetic coupling can also be weak enough to allow the pusher plate to be moved from the home position by the PPI under the force of the drive pin without requiring excessive torque and/or power from the drive motor. Some implementations use neodymium, or "rare earth," magnets, for example, because of their ability to maintain their magnetism and their relatively high magnetic strength.

The illustrated configuration of magnetic elements 905 includes two magnets spaced apart in the direction of travel of the pusher plate. This can spread out the force exerted by the magnets on the pusher plate. That is, the required lateral force provided by magnets in this position can last for a longer distance as the pusher plate slides back and forth. Other embodiments position the magnets pole-to-pole, or axially. These arrangements can provide the attracting force between the magnets, thereby holding the plate in the desired position. However, because this attractive force exponentially decays with distance, such arrangements can cause unnecessary shock to the pusher plate and to the gear driving it. Still other embodiments include magnetic materials, such as suitable types of steel, that are attracted by magnetic forces from magnets in the home holding region of the PPI (e.g., or, alternatively, the home holding region of the PPI includes such materials, and the home holding mechanism 705 includes magnets). As described above, certain implementations do not use magnets to provide home-holding forces, and instead rely on other techniques, such as frictional forces, electromagnetic forces, latches, etc. In such embodiments, features of the home holding mechanism 705 are designed to interface with features of the home holding region of the PPI to hold the pusher plate in its home region when desired and with a desired amount of force.

Figure 7:
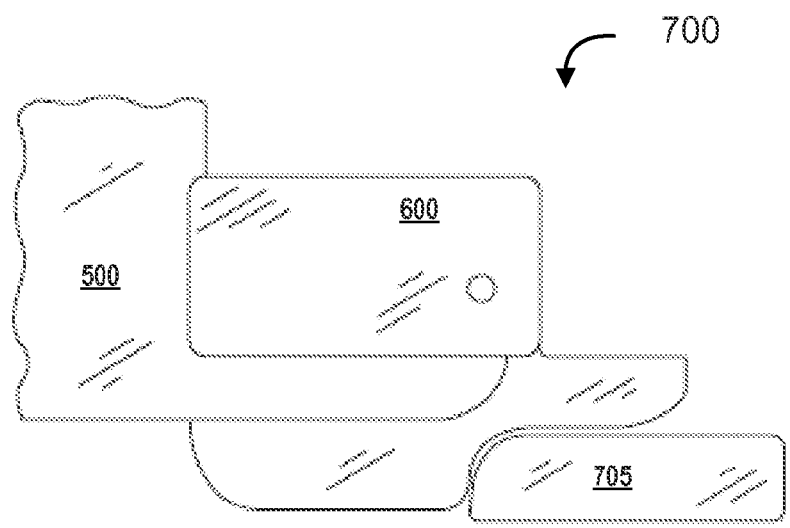
FIG. 7 shows an implementation of a partial contextual representation of the PPI for added clarity.

FIG. 7 shows an implementation of a partial contextual representation 700 of the PPI 600 for added clarity. As illustrated, the pusher plate interface region 610 of the PPI 600 of FIG. 6 can be coupled with the pusher plate 500 of FIG. 5, and the home holding region 615 of the PPI 600 of FIG. 6 can be coupled (i.e., when the pusher plate 500 is in the home position) with the home holding mechanism 705 of FIG. 9. In this position, the PPI 600 acts as a selectively coupling between the pusher plate 500, the drive elevator (not shown), and the home holding mechanism 705. For example, as illustrated, implementations of the PPI 600 can extend forward of the slot and the end of the pusher plate 500, and can house one or more magnets 620 that can attract the plate to its home position via magnetic elements 905 of the home-holding mechanism 705 (e.g., during loading/unloading and at the end of the unbuckling event).

Figure 10:
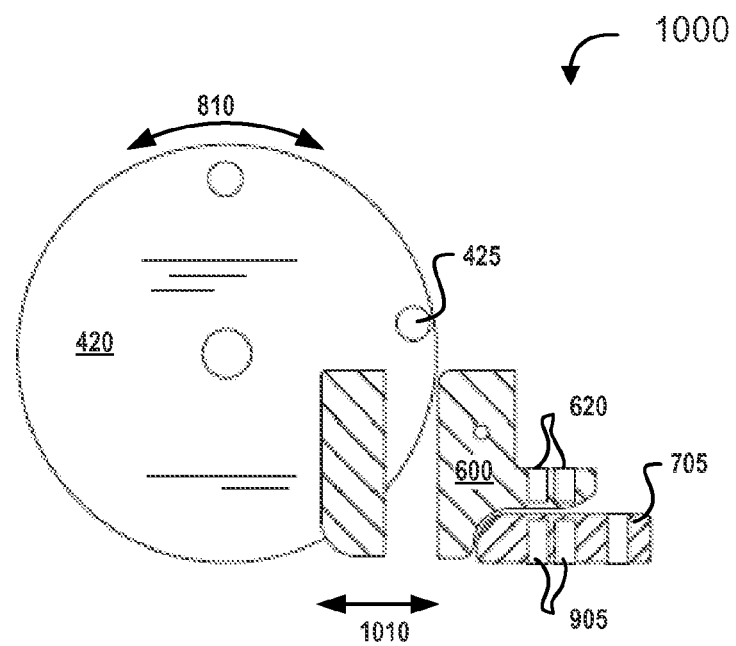
FIG. 10 shows a similar partial contextual representation to the one in FIG. 7, but with a cross-sectional view of the PPI and the home holding mechanism.

FIG. 10 shows a similar partial contextual representation 100 to the one in FIG. 7, but with a cross-sectional view of the PPI 600 and the home holding mechanism 705. The cross-sectional representations clearly indicate that the PPI 600 can extend forward of the slot (e.g., the pin interface region) and the end of the pusher plate 500, and can house one or more magnets 620 that can attract the plate to its home position via magnetic elements 905 of the home-holding mechanism 705. FIG. 10 also shows context of the drive gear 420. Rotation of the drive gear 420 in the rotational direction of arrow 810 can cause pin 425 to interface with the pin interface region of the PPI 600 in such a way that drives the PPI 600 (and the coupled pusher plate) in the lateral direction of arrow 1010.

Figure 11:
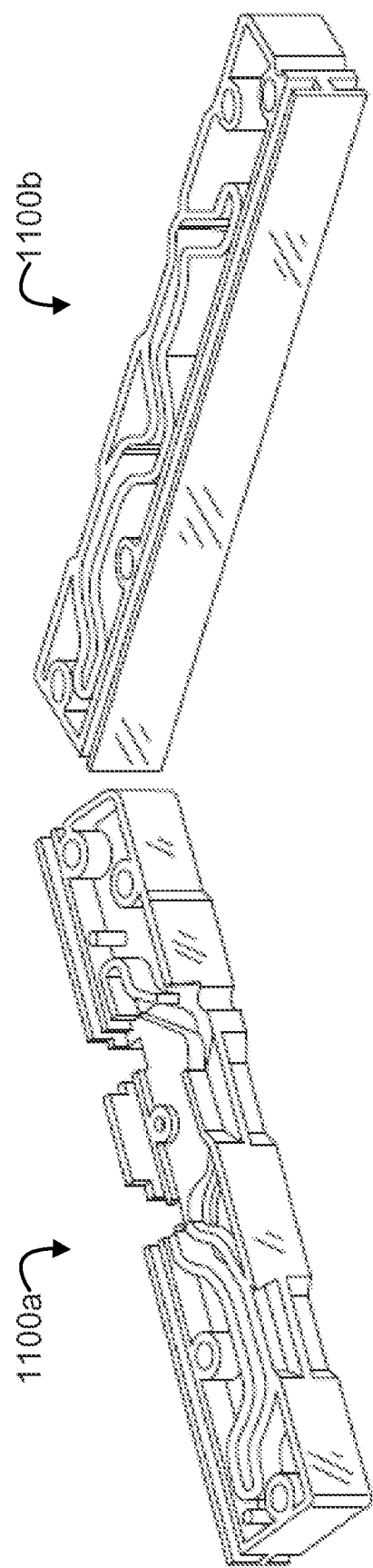
FIG. 11 shows an illustrative implementation of cam tracks with sensor mounts for use in certain embodiments.

FIG. 11 shows an illustrative implementation of cam tracks 1100 with sensor mounts for use in certain embodiments. For example, sensors that relay pusher plate location can be located to accommodate shortening of the drive loader. In the illustrated implementation, the sensors are located toward the front of the drive, and can be mounted to the underside of the lower cam track.

Figure 12:
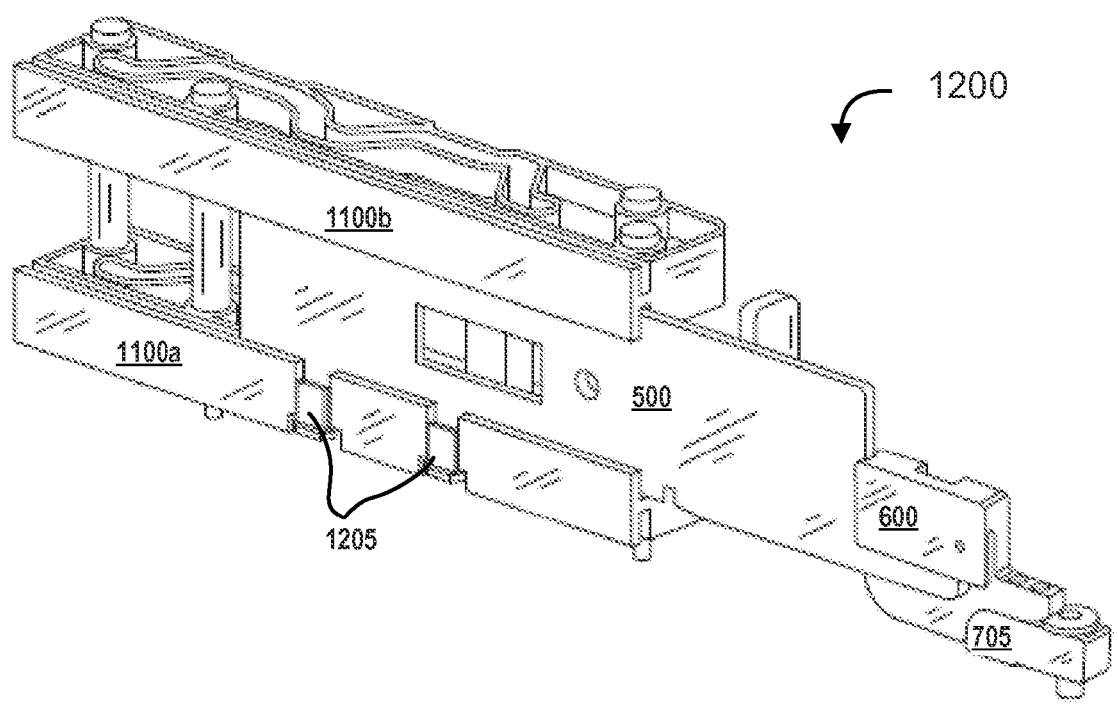
FIG. 12 shows an assembled view of a springless implementation of a buckling mechanism that uses the components shown in, and described with reference to, FIGS. 5, 6, 9, 10, and 11.

FIG. 12 shows an assembled view of a springless implementation of a buckling mechanism 1200 that uses the components shown in, and described with reference to, FIGS. 5, 6, 9, 10, and 11. For example, the illustrative buckling assembly 1200 includes a pusher plate 500, PPI 600, home holding mechanism 705, lower cam track 1100*a* with sensors 1205, and upper cam track 1100*b*. It is noted that other embodiments include additional features. For example, various embodiments include ribbing of the cam track, reorientation of home holding magnets, alternative attachments of the PPI, etc. In one implementation, the cam tack is ribbed around the cutout for the sensors and sensor board to add structural support to the cam track part as a whole. This can help ensure the track does not flex and disturb the performance of the buckler. In another implementation, home holding magnets can be reoriented to move and connect in the axial direction in order to achieve a smoother coupling and decoupling profile. In another implementation, the PPI can be attached via several different techniques that are sturdy, easy to install, and/or inexpensive, for example, using direct molding onto the pusher plate, a press fit directly onto the pusher plate, a self-clinching nut, adhesive, etc.

Figure 13:
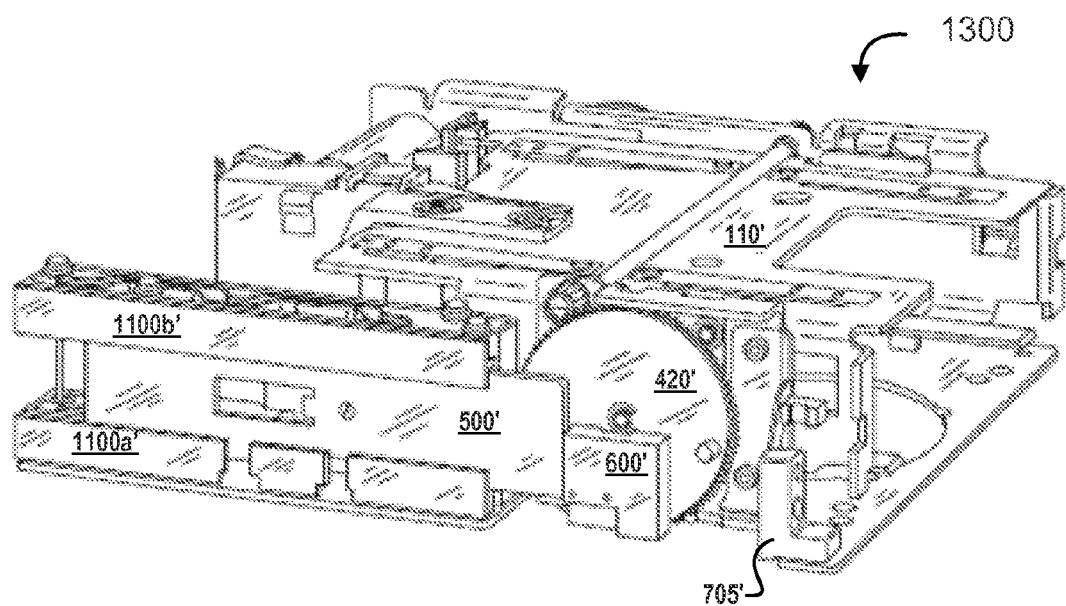
FIG. 13 shows another implementation of a springless buckling assembly in context of a tape drive loader system, according to various embodiments.

FIG. 13 shows another implementation of a springless buckling assembly in context of a tape drive loader system 1300, according to various embodiments. As in the implementation of FIG. 12, the illustrated implementation of FIG. 13 includes a pusher plate 500', PPI 600', home holding mechanism 705', lower cam track 1100a', and upper cam track 1100b'. The additional loader context also shows an illustrative elevator 110', drive gear 420', and other components. The illustrated implementation orients the magnets of the home-holding mechanism 705' and the PPI 600' to magnetically couple along their magnetic axes. The illustrated implementation is springless, operates to control the pusher plate with the drive motor, and uses a pin slotted into a groove to drive the pusher plate to match its position when moving in both forward (buckling) and reverse (unbuckling) directions.

Figure 14:
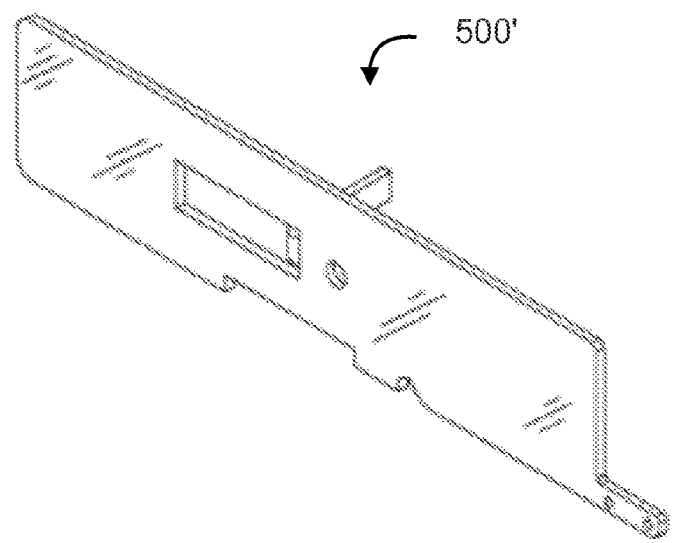
FIG. 14 shows an illustrative pusher plate 500' for use in an embodiment of the springless buckling assembly of FIG. 13.
Figure 15A:
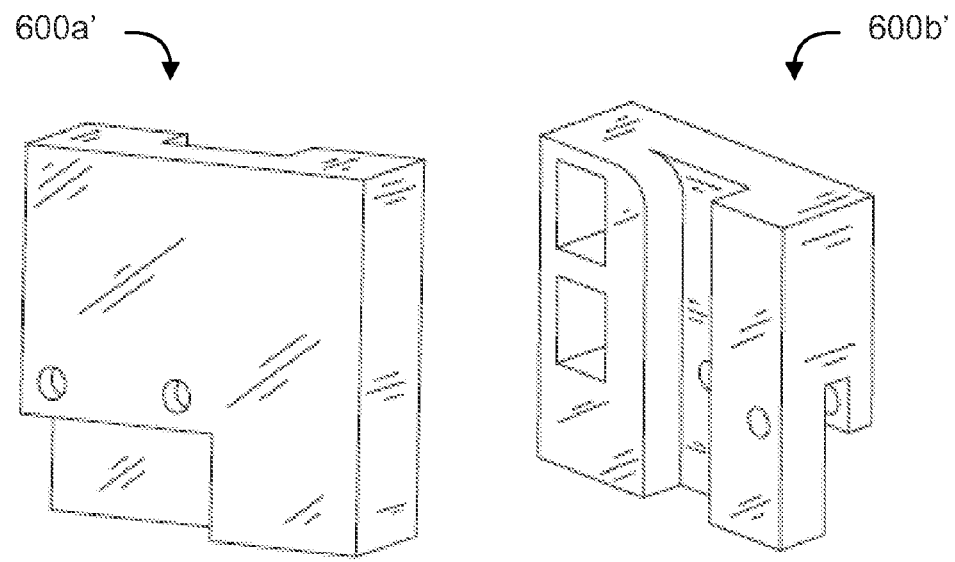
FIG. 15A shows front and rear views of an illustrative PPI for use in an embodiment of the springless buckling assembly of FIG. 13.
Figure 15B:
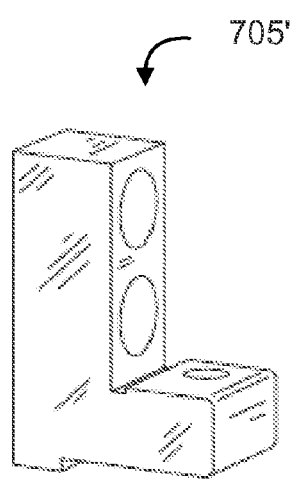
FIG. 15B shows an illustrative home holding device for use in an embodiment of the springless buckling assembly of FIG. 13.
Figure 16:
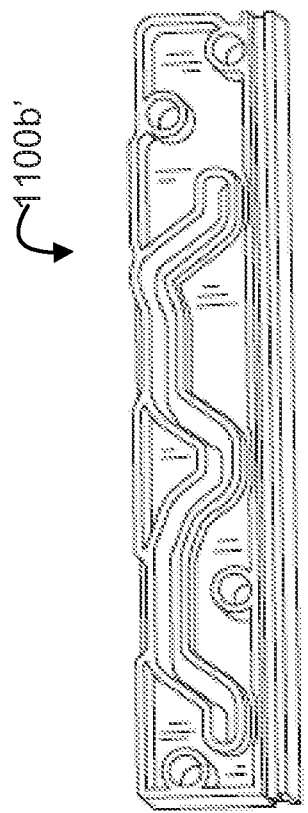
FIG. 16 shows top and bottom portions of an illustrative cam track design for use in an embodiment of the springless buckling assembly of FIG. 13.
Figure 16:
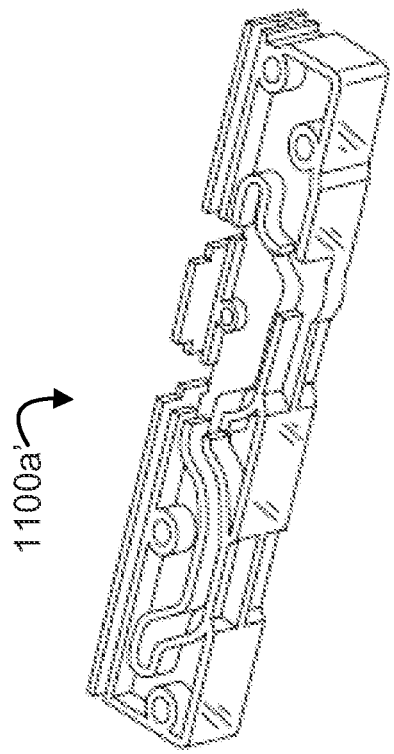

For the sake of added clarity, certain components of the buckling mechanism of FIG. 13 are shown independently. FIG. 14 shows an illustrative pusher plate 500' for use in an embodiment of the springless buckling assembly of FIG. 13. The back end of the plate is shortened to fit within a shorter desired footprint of the loader mechanism. The pusher plate can include two slots to trip position sensors, and can extend out and include an attachment point for the PPI 600'. FIG. 15A shows front and rear views of an illustrative PPI 600' for use in an embodiment of the springless buckling assembly of FIG. 13. Implementations can be a plastic piece fastened to the pusher plate for interfacing between the pusher plate, the rotating drive pin on the elevator gear, and the home holding device. As illustrated, the PPI 600' can include a slot where the drive pin can apply force to the pusher plate to perform the buckling and unbuckling operations. The PPI 600' can attach to the pusher plate by press fitting (e.g., with two force-fit pins). The press fit can be used to secure the PPI 600' to the pusher plate 500', and the pin can act as a mechanical backup. Implementations of the PPI 600' can also house magnets that attract the pusher plate 500' to the home holding device 705' when the pusher plate 500' is in the home position. The magnetic coupling can maintain the pusher plate 500' in the home position until a cartridge is loaded or unloaded, and this can increase reliability and consistency of the loader mechanism operation. FIG. 15B shows an illustrative home holding device 705' for use in an embodiment of the springless buckling assembly of FIG. 13. Implementations can be a plastic piece coupled with the drive loader chassis (e.g., with a single screw or any other suitable coupling). Implementations can house magnets designed (e.g., positioned, oriented, sized, etc.) to magnetically couple with the magnets of the PPI 600' when the pusher plate 500' is at or near the home position. Some implementations are designed so that the loader mechanism chassis acts to resist rotation of the piece. FIG. 16 shows top and bottom portions of an illustrative cam track design 1100' for use in an embodiment of the springless buckling assembly of FIG. 13. As described, implementations can be designed to accommodate shortening of the loader and to accommodate sensors that relay pusher plate location that are located differently due to the changes in loader assembly design (e.g., sensors can be located toward the front of the drive and can be mounted to the underside of the lower cam track).

Figure 17B:
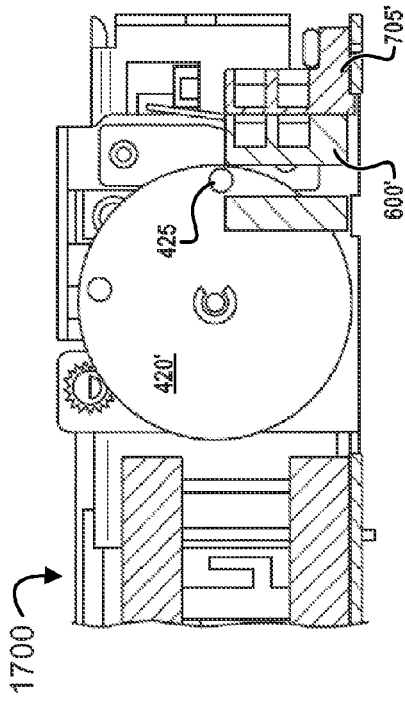
FIGS. 17A and 17B show a first stage of an assembly view of a loader assembly and a partial cut-away portion of the loader assembly, respectively.
Figure 17A:
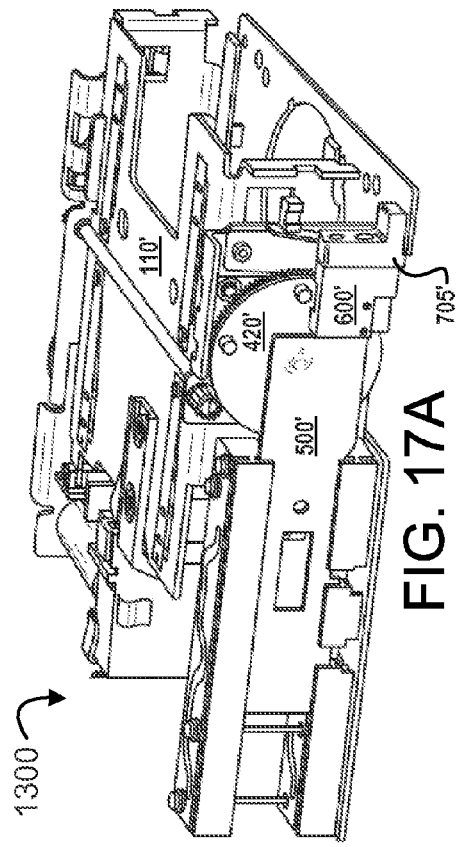

For the sake of added clarity, the following set of figures steps through an illustrative mechanical process occurring in a single load-unload cycle using embodiments of the springless design described above. FIGS. 17A and 17B show a first stage of an assembly view of a loader assembly 1300 and a partial cut-away portion 1700 of the loader assembly, respectively. The loader assembly 1300 is illustrated as the loader assembly 1300 described with reference to FIGS. 13-16, including the pusher plate 500', PPI 600', home holding mechanism 705', drive gear 420', and elevator 110'. For example, the elevator 110' has finished lowering the tape drive into place and the motor has been turned off briefly. The force of the leader tension on the pusher plate 500' is counteracted by the home holding force of the home holding mechanism 705', ensuring the buckler is in the correct home position while the elevator 110' is in motion.

Figure 18B:
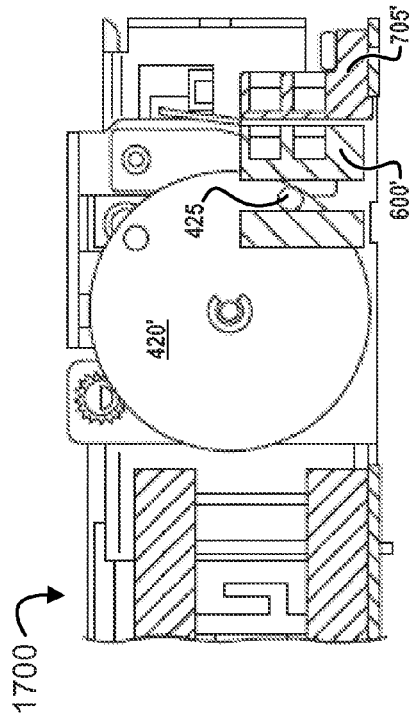
FIGS. 18A and 18B show a second stage of the assembly view of the loader assembly and the partial cut-away portion of the loader assembly, respectively.
Figure 18A:
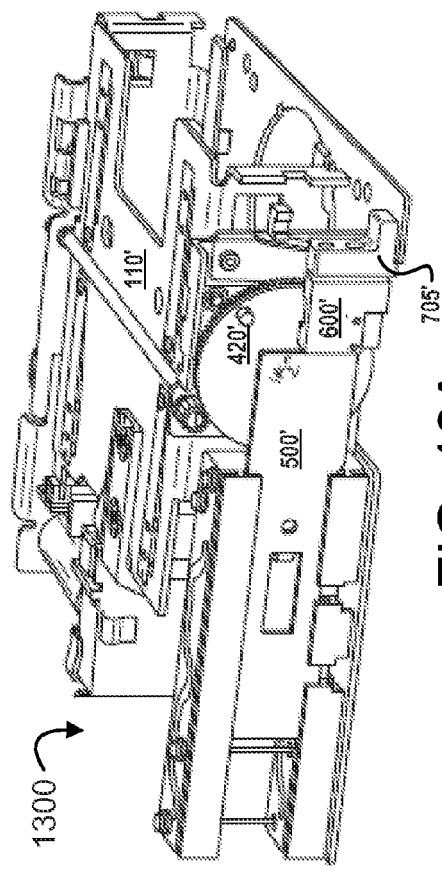

FIGS. 18A and 18B show a second stage of the assembly view of the loader assembly 1300 and the partial cut-away portion 1700 of the loader assembly, respectively. In the second stage, the buckling process begins, and the motor resumes rotating and drives a first pin 425 of the main drive gear 420' into the post path on the PPI 600'. After some amount of drive gear 420' rotation, the pin 425 can ultimately impacts a wall of the post path, thereby pushing against the holding force of the home holding mechanism 705' and beginning to drive the pusher plate 500' forward. In this position, the home holding force (e.g., magnetic force) can effectively dominate the leader tension.

Figure 19B:
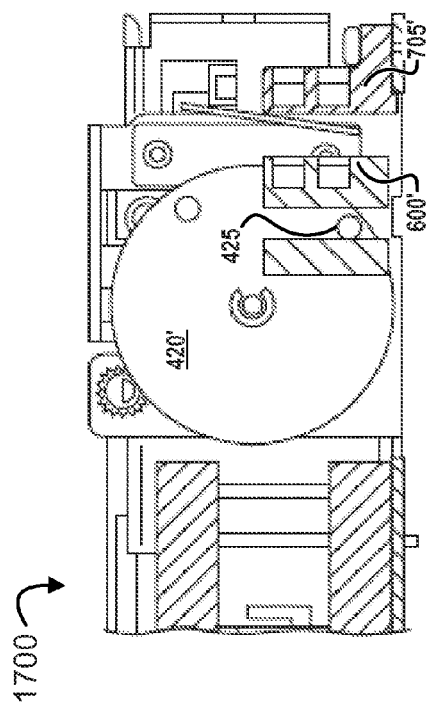
FIGS. 19A and 19B show a third stage of the assembly view of the loader assembly and the partial cut-away portion of the loader assembly, respectively.
Figure 19A:
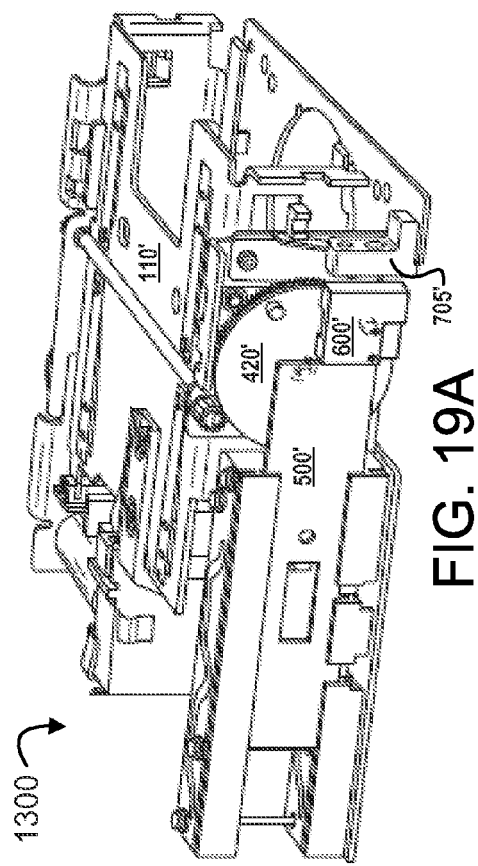

FIGS. 19A and 19B show a third stage of the assembly view of the loader assembly 1300 and the partial cut-away portion 1700 of the loader assembly, respectively. In the third stage, the pusher plate 500' can continue to move under the force of the pin 425, and the home holding mechanism 705' can lose strength until the leader tension dominates. At that time, the pusher plate 500' can move forward under leader tension until the pin 425 impacts the back half of the PPI 600' post path. In this position, the leader tension on the buckling mechanism can be counteracted by the force of the pin 425 on the back of the PPI 600' post path.

Figure 20B:
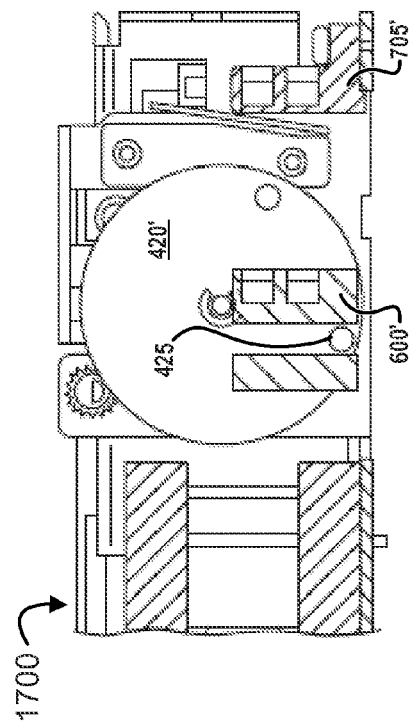
FIGS. 20A and 20B show a fourth stage of the assembly view of the loader assembly and the partial cut-away portion of the loader assembly, respectively.
Figure 20A:
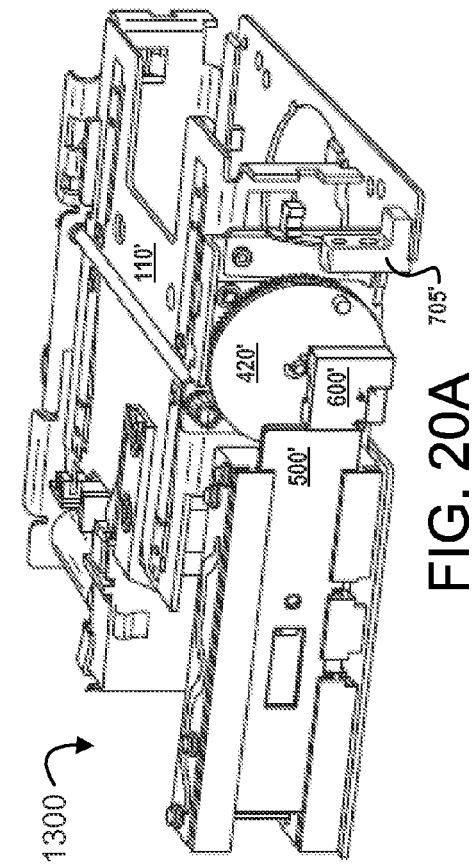

FIGS. 20A and 20B show a fourth stage of the assembly view of the loader assembly 1300 and the partial cut-away portion 1700 of the loader assembly, respectively. In the fourth stage, the main drive gear 420' can continue to rotate, and the pusher plate 500' can be moved into the buckling position. In such a position, the leader tension can be lost as the two leaders buckle.

Figure 21A:
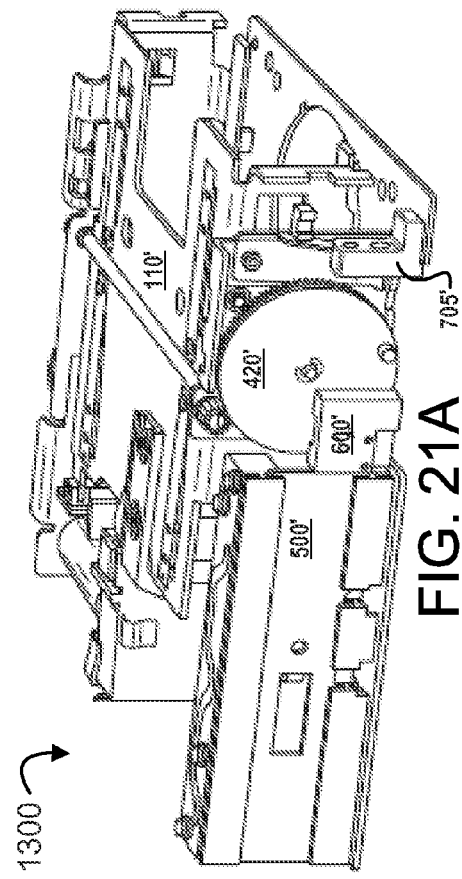
FIGS. 21A and 21B show a fifth stage of the assembly view of the loader assembly and the partial cut-away portion of the loader assembly, respectively.
Figure 21B:
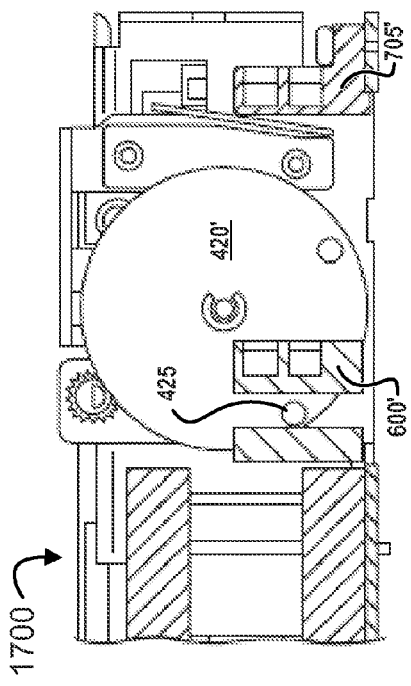

FIGS. 21A and 21B show a fifth stage of the assembly view of the loader assembly 1300 and the partial cut-away portion 1700 of the loader assembly, respectively. In the fifth stage, the pusher plate 500' can be pushed beyond the point of buckling by the rotating pin 425 in the PPI 600' until the buckler hook is stored away from the two leaders. This can effectively complete the buckling action. In this position, the pin 425 in the post path can ensure that the pusher plate 500' stays tucked away from the motion of the tape during operation.

Figure 22A:
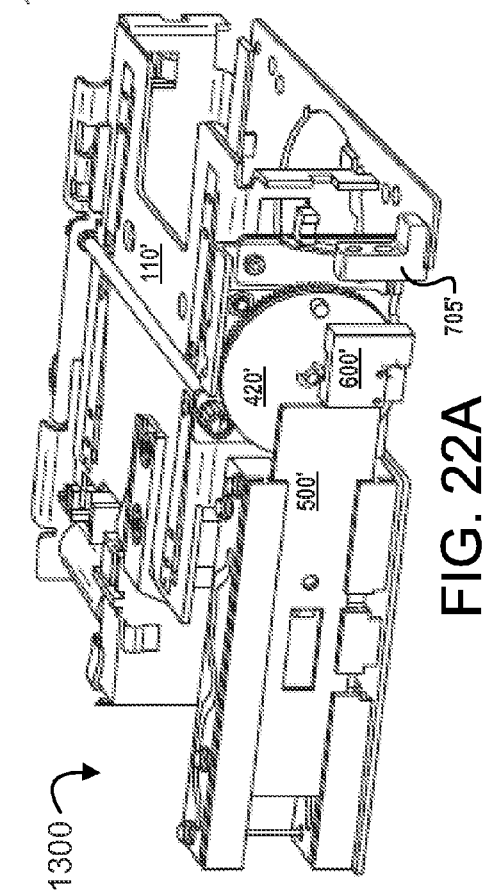
FIGS. 22A and 22B show a sixth stage of the assembly view of the loader assembly and the partial cut-away portion of the loader assembly, respectively.
Figure 22B:
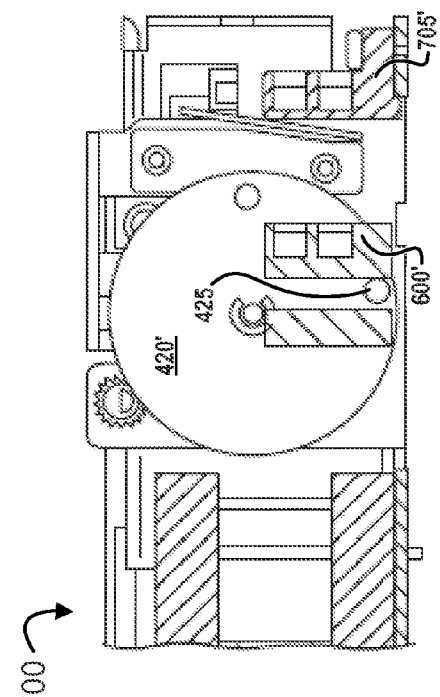

FIGS. 22A and 22B show a sixth stage of the assembly view of the loader assembly 1300 and the partial cut-away portion 1700 of the loader assembly, respectively. In the sixth stage, unbuckling can begin when the pusher plate 500' is moved backwards by the pin 425 in the PPI 600' until the point of buckling. In such a condition, the leader can be picked up by the buckling hook, which can transfer the leader tension to the buckler.

FIGS. 23A and 23B show a seventh stage of the assembly view of the loader assembly 1300 and the partial cut-away portion 1700 of the loader assembly, respectively. In the seventh stage, the pusher plate 500' can continue to be driven in the reverse direction with the rotation of the pin 425 in the post path until the home holding mechanism 705' overpowers the leader tension. At that point, the pin 425 can shift to the front of the post path as it counteracts the force of the dominating home holding force.

Subsequently, the buckling mechanism can effectively return to a configuration that looks like the one shown in FIGS. 17A and B. In this eighth stage, guided by the pin 425 in the post path, the pusher plate 500' can continue to move in the reverse direction toward the home position. The pusher plate 500' can then be held in place by the home holding mechanism 705', allowing the pin 425 to rotate free of the post path. This can effectively end the unbuckling process.

Figure 24:
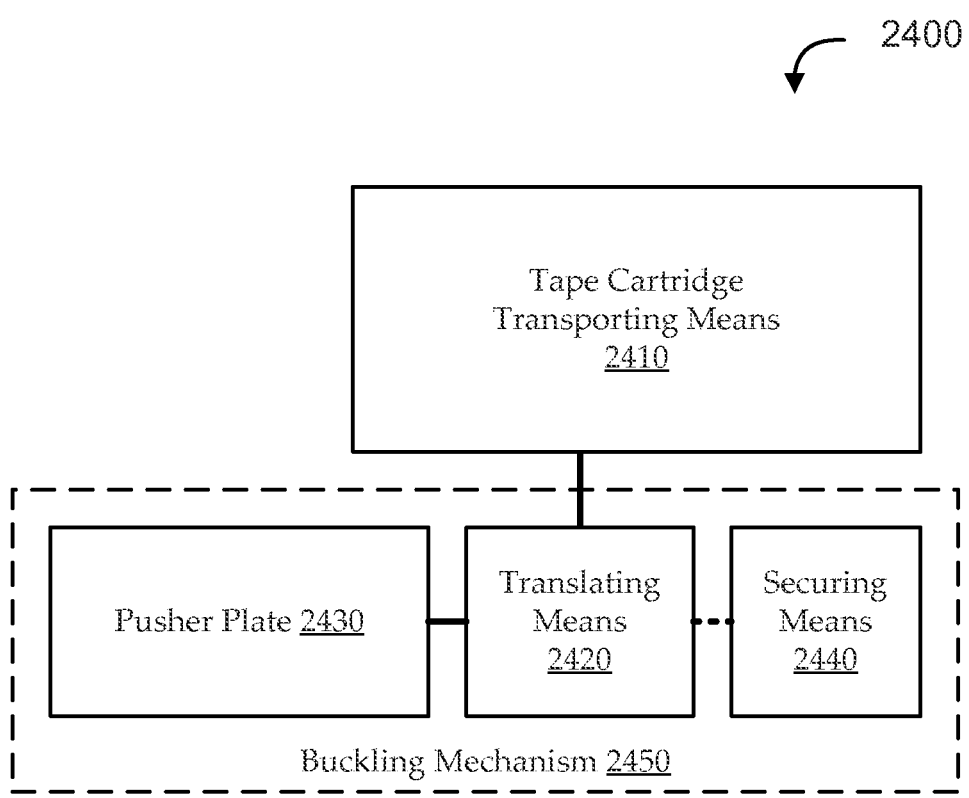
FIG. 24 shows a functional block diagram of an illustrative tape drive system that operates to perform functionality of some of the embodiments described herein.

While the above descriptions focus on particular implementations, those implementations are not intended to be limiting. Rather alternative limitations can include any suitable components, assemblies, etc. for performing the functions described above. FIG. 24 shows a functional block diagram of an illustrative tape drive system 2400 that operates to perform functionality of some of the embodiments described herein. As illustrated, the tape drive system 2400 can include a tape cartridge transporting means 2410 in communication with a buckling mechanism 2450. The tape cartridge transporting means 2410 can be implemented as an elevator of a tape drive loader, or any other suitable component for transporting a tape cartridge from an unloaded position to a loaded position during tape cartridge loading and to transport the tape cartridge from the loaded position to the unloaded position during tape cartridge unloading.

The buckling mechanism 2450 can include a translating means 2420, a pusher plate 2430, and a securing means 2440. The pusher plate 2430 can move in a buckling direction and an unbuckling direction between a home position and a buckling position. Some implementations of the translating means 2420 can translate motion of the transporting means 2410 into a driving force that drives the pusher plate in the buckling direction during tape cartridge loading and drives the pusher plate in the unbuckling direction during tape cartridge unloading. For example, the motion of the transporting means 2410 can be a rotational motion, the driving force can be a lateral driving force, and the translating means 2420 can translate the rotational motion of the transporting means 2410 into the lateral driving force. In some embodiments, the transporting means 2410 include a feature (e.g., a pin) that rotates in a first rotational direction during tape cartridge loading and in a second rotational direction during tape cartridge unloading. In such embodiments, the translating means can receive the feature to couple the pusher plate 2430 with the transporting means 2410 in a manner that translates rotation of the feature in the first rotational direction into motion of the pusher plate 2430 in the buckling direction and translates rotation of the feature in the second rotational direction into motion of the pusher plate 2430 in the unbuckling direction. Some implementations of the securing means 2440 can removably secure the pusher plate in its home position with at least a predetermined amount of force (e.g., magnetically, mechanically, etc.) when the transporting means 2410 are in the unloaded position.

Figure 25:
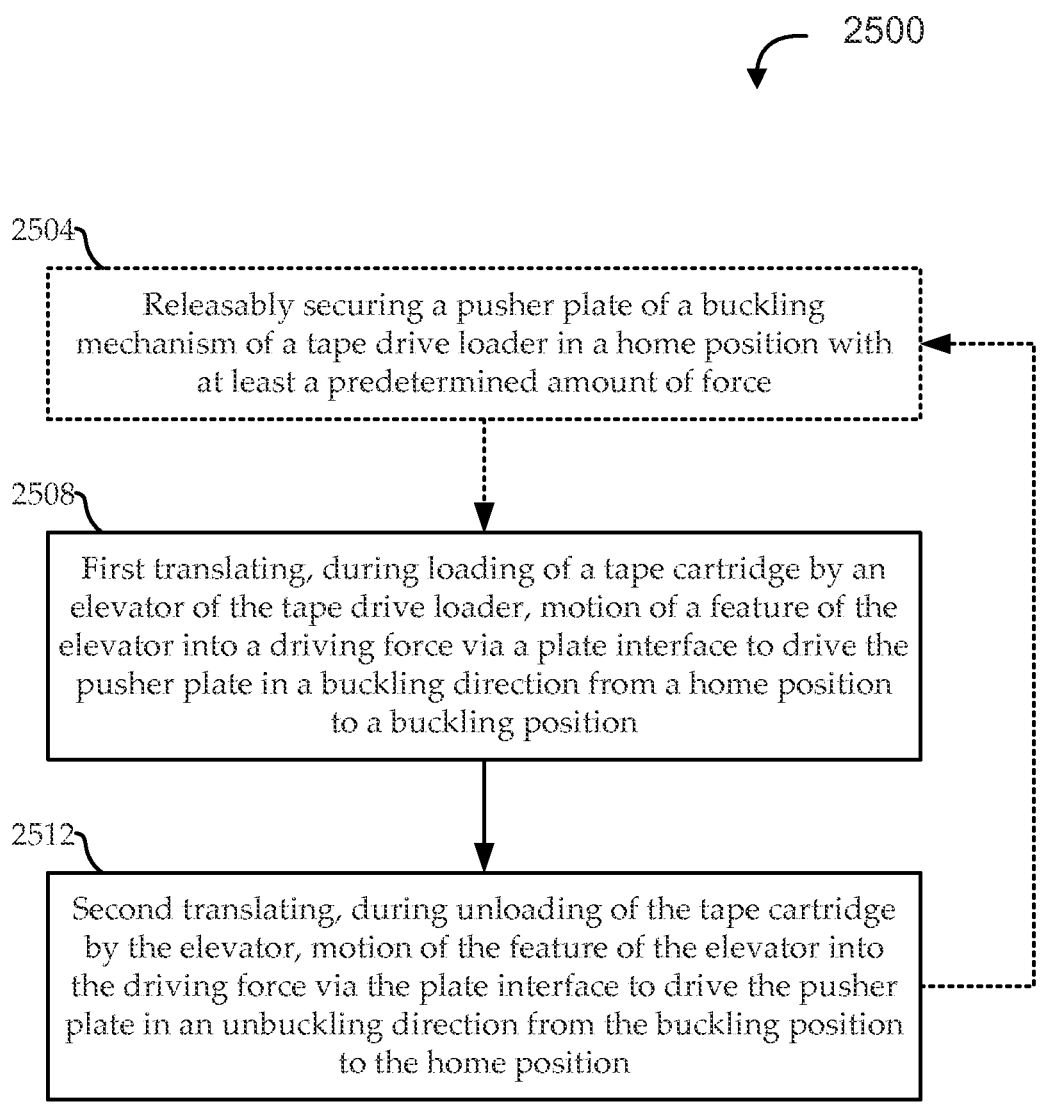
FIG. 25 shows a flow diagram of an illustrative method for buckling in a tape drive loader, according to various embodiments.

FIG. 25 shows a flow diagram of an illustrative method 2500 for buckling in a tape drive loader, according to various embodiments. Embodiments of the method 2500 begin at stage 2508 by first translating, during loading of a tape cartridge by an elevator of the tape drive loader, motion of a feature of the elevator into a driving force via a plate interface to drive a pusher plate of a buckling mechanism of the tape drive loader in a buckling direction from a home position to a buckling position. At stage 2512, the method 2500 can second translate, during unloading of the tape cartridge by the elevator, motion of the feature of the elevator into the driving force via the plate interface to drive the pusher plate in an unbuckling direction from the buckling position to the home position. In some embodiments, at stage 2504, the method 2500 can releasably secure the pusher plate in the home position with at least a predetermined amount of force (e.g., prior to the first translating and/or subsequent to the second translating).

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims. The various operations of methods and functions of certain system components described above can be performed by any suitable means capable of performing the corresponding functions.

Other examples and implementations are within the scope and spirit of the disclosure and appended claims. For example, features implementing functions can also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A buckling assembly for a tape drive loader comprising:
   a pusher plate that operates to move in a buckling direction and an unbuckling direction between a home position and a buckling position; and
   a plate interface that couples the pusher plate with an elevator of the tape drive loader so as to translate rotational motion of a gear of the elevator into a lateral driving force that drives the pusher plate laterally in the buckling direction during tape cartridge loading by the elevator and drives the pusher plate in the unbuckling direction during tape cartridge unloading by the elevator,
   wherein the gear of the elevator comprises a pin oriented to protrude from the gear and to rotate along with the rotational motion of the gear, and the plate interface comprises a slot that interfaces with the pin to couple the pusher plate with the elevator.

2. The buckling assembly of claim 1, wherein:
   the plate interface is configured so that the pusher plate is decoupled from the elevator when the pusher plate is in its home position, and so that the pusher plate becomes coupled with the elevator during tape cartridge loading by the elevator.

3. The buckling assembly of claim 1, wherein:
the pusher plate comprises the plate interface.

4. The buckling assembly of claim 1, wherein:
the plate interface is affixed to the pusher plate.

5. The buckling assembly of claim 1, further comprising:
a home holding mechanism that operates to releasably couple with the pusher plate when the pusher plate is substantially in its home position in such a way that secures the pusher plate in its home position with at least a predetermined amount of force.

6. The buckling assembly of claim 5, wherein:
the home holding mechanism operates to releasably couple with the pusher plate via a home holding region of the plate interface.

7. The buckling assembly of claim 5, wherein:
the home holding mechanism operates to releasably couple with the pusher plate using a magnetic holding force.

8. The buckling assembly of claim 7, wherein:
each of the home holding mechanism and a home holding region of the plate interface comprises at least one magnet that operate to releasably couple the home holding mechanism with the pusher plate using the magnetic holding force.

9. The buckling assembly of claim 7, wherein:
one of the home holding mechanism or a home holding region of the plate interface comprises at least one magnet, and the other of the home holding mechanism or the home holding region of the plate interface comprises magnetic material, together operable to releasably couple the home holding mechanism with the pusher plate using the magnetic holding force.

10. The buckling assembly of claim 5, wherein:
the home holding mechanism operates to releasably couple with the pusher plate using a mechanical holding force.

11. A tape drive system comprising:
means for transporting a tape cartridge from an unloaded position to a loaded position during tape cartridge loading and to transport the tape cartridge from the loaded position to the unloaded position during tape cartridge unloading;
a pusher plate that operates to move in a buckling direction and an unbuckling direction between a home position and a buckling position; and
means for translating rotational motion of a pin of the means for transporting into a lateral driving force that drives the pusher plate, via a slot that interfaces with the pin to couple the pusher plate with the means for transporting, laterally in the buckling direction during tape cartridge loading and laterally in the unbuckling direction during tape cartridge unloading.

12. The tape drive system of claim 11, wherein:
the motion of the means for transporting is a rotational motion;
the driving force is a lateral driving force; and
the means for translating comprise means for translating the rotational motion of the means for transporting into the lateral driving force.

13. The tape drive system of claim 11, wherein:
the means for transporting comprise a feature that rotates in a first rotational direction during tape cartridge loading and in a second rotational direction during tape cartridge unloading; and
the means for translating comprise means for receiving the feature to couple the pusher plate with the means for transporting in a manner that translates rotation of the feature in the first rotational direction into motion of the pusher plate in the buckling direction and translates rotation of the feature in the second rotational direction into motion of the pusher plate in the unbuckling direction.

14. The tape drive system of claim 11, further comprising:
means for securing the pusher plate in its home position with at least a predetermined amount of force when the means for transporting are in the unloaded position.

15. The tape drive system of claim 14, wherein the means for securing comprise a magnet.

16. A method for buckling in a tape drive loader, the method comprising:
first translating, during loading of a tape cartridge by an elevator of the tape drive loader, rotational motion of a pin of the elevator into a lateral driving force, via a slot of a plate interface that interfaces with the pin to couple a pusher plate with the elevator, to drive the pusher plate of a buckling mechanism of the tape drive loader in a buckling direction from a home position to a buckling position; and
second translating, during unloading of the tape cartridge by the elevator, rotational motion of the pin into the lateral driving force via the slot of the plate interface to drive the pusher plate in an unbuckling direction from the buckling position to the home position.

17. The method of claim 16, further comprising:
releasably securing the pusher plate in the home position with at least a predetermined amount of force prior to the first translating and subsequent to the second translating.

* * * * *

UNITED STATES PATENT AND TRADEMARK OFFICE
CERTIFICATE OF CORRECTION

| | | |
|---|---|---|
| PATENT NO. | : 9,171,566 B2 | |
| APPLICATION NO. | : 14/261238 | |
| DATED | : October 27, 2015 | |
| INVENTOR(S) | : Vanderheyden et al. | |

It is certified that error appears in the above-identified patent and that said Letters Patent is hereby corrected as shown below:

In the Specification

In column 2, line 67, delete "embodiments" and insert -- embodiments; --, therefor.

Signed and Sealed this
Twenty-eighth Day of June, 2016

Michelle K. Lee
*Director of the United States Patent and Trademark Office*